(12) United States Patent
Schmuhl et al.

(10) Patent No.: US 9,039,403 B2
(45) Date of Patent: May 26, 2015

(54) EXTRUSION LINE FOR PRODUCING PEROXIDE-CROSS-LINKED POLYETHYLENE PIPES

(71) Applicant: Inoex GmbH, Bad Oeynhausen (DE)

(72) Inventors: Jörg Schmuhl, Königs Wusterhausen (DE); Martin Deters, Bissendorf (DE)

(73) Assignee: INOEX GMBH, Bad Oeynhausen (DE)

( * ) Notice: Subject to any disclaimer, the term of this patent is extended or adjusted under 35 U.S.C. 154(b) by 0 days.

(21) Appl. No.: 14/140,936

(22) Filed: Dec. 26, 2013

(65) Prior Publication Data

US 2014/0106017 A1    Apr. 17, 2014

Related U.S. Application Data

(62) Division of application No. 13/012,685, filed on Jan. 24, 2011, now Pat. No. 8,641,947.

(30) Foreign Application Priority Data

Jan. 23, 2010   (DE) .......................... 10 2010 005509

(51) Int. Cl.
| | |
|---|---|
| *B29C 47/90* | (2006.01) |
| *B29C 47/00* | (2006.01) |
| *B29C 47/88* | (2006.01) |
| *B29C 35/10* | (2006.01) |
| *B29C 55/22* | (2006.01) |
| *B29C 47/92* | (2006.01) |
| *B29C 35/08* | (2006.01) |
| *B29K 105/10* | (2006.01) |
| *B29K 105/24* | (2006.01) |
| *B29L 23/00* | (2006.01) |

(52) U.S. Cl.
CPC .......... *B29C 47/0057* (2013.01); *B29C 47/881* (2013.01); *B29C 47/901* (2013.01); *B29C 35/10* (2013.01); *B29C 47/00* (2013.01); *B29C 47/0023* (2013.01); *B29C 55/22* (2013.01); *B29C 2035/0822* (2013.01); *B29K 2023/06* (2013.01); *B29K 2105/101* (2013.01); *B29K 2105/24* (2013.01); *B29K 2105/246* (2013.01); *B29L 2023/00* (2013.01); *B29L 2023/22* (2013.01); *B29C 47/92* (2013.01); *B29C 47/0021* (2013.01); *B29C 47/0054* (2013.01); *B29C 47/0066* (2013.01); *B29C 47/8815* (2013.01); *B29C 2947/92123* (2013.01); *B29C 2947/92428* (2013.01); *B29C 2947/92514* (2013.01); *B29C 2947/92619* (2013.01); *B29C 2947/92647* (2013.01); *B29C 2947/92904* (2013.01); *B29C 2947/92923* (2013.01)

(58) Field of Classification Search
CPC ............ B29C 47/0023; B29C 47/0057; B29C 47/881; B29C 47/901
USPC ........................ 425/377, 379.1, 380, 404, 445
See application file for complete search history.

(56) References Cited

U.S. PATENT DOCUMENTS

2013/0228955 A1* 9/2013 Heino et al. .................. 264/492

FOREIGN PATENT DOCUMENTS

EP    2052830 A2 *  4/2009

*Primary Examiner* — Yogendra Gupta
*Assistant Examiner* — Joseph Leyson
(74) *Attorney, Agent, or Firm* — Jennifer S. Stachniak; Robert W. Becker

(57) ABSTRACT

An extrusion line for the production of peroxide cross-linked polyethylene pipes includes a cross-linking oven (5, 13) having an actuated deflection roller (7). The cross-linking oven has a first heating section (A) that extends from an inlet to said deflection roller (7) and a second heating section (B) that extends from said deflection roller to an outlet. An element is provided for adjusting a height of the deflection roller (7) and an angle of the first and second heating sections (A, B) relative to a horizontal plane.

2 Claims, 3 Drawing Sheets

EXTRUSION LINE FOR PRODUCING PEROXIDE-CROSS-LINKED POLYETHYLENE PIPES

CROSS-REFERENCE TO RELATED APPLICATIONS

The present application is a divisional application of co-pending U.S. application Ser. No. 13/012,685, filed Jan. 24, 2011.

BACKGROUND OF THE INVENTION

The present invention relates to a method of producing peroxide-cross-linked or polymerized polyethylene pipes in an extrusion line that includes an extruder, a cross-linking oven and a withdrawal mechanism or haul-off, wherein the cross-linking oven has a first heating section that extends from an inlet to an actuated deflection roller, and a second heating section that extends from the deflection roller to an outlet, with the extruded pipe being subjected to a stretching process. The present invention also relates to an extrusion line having a cross-linking oven comprised of a first heating section that extends from the inlet to an actuated deflection roller, and a second heating section that extends from the deflection roller to the outlet.

It is known that the properties of polymers can be improved by cross-linking or polymerization. In contrast to non-cross-linked pipes, peroxide-cross-linked polyethylene pipes have the advantage of enhanced heat resistance, mechanical strength and chemical resistance, which makes them suitable for under-floor heating pipes, hot water pipes and drinking water pipes.

DE 696 22 053 T2 describes an extrusion line for in-line cross-linking of polyethylene pipes. The extruder of this line has an upwardly angled head, which opens into a cross-linking oven, in which the pipe is subsequently extruded vertically. The pipe is led along a first heating section vertically upward in the cross-linking oven, reversed there by 180 degrees around an electric driven deflection roller and then led along a second heating section vertically downward, where it is deflected into the horizontal plane by another roller at the outlet of the cross-linking oven and then led through a calibration and cooling unit. On the way through the cross-linking oven, the pipe is led along infrared units, which provide the heat into the pipe that is required for cross-linking. The calibration and cooling unit is followed by a haul-off, with which the pipe is pulled through the extrusion line, and after which, it is finally coiled.

DE 10 2007 050 939 A1 describes a cross-linking oven, which has a first heating section that extends from its inlet to an electric driven deflection roller and a second heating section from the deflection roller to its outlet. In this case, a horizontally extruded pipe is at first deflected by 90 degrees around a roller at the inlet of the cross-linking oven, so as to facilitate its passage along the first heating section vertically upward in the cross-linking oven, reversed there by 180 degrees around a deflection roller and then led along a second heating section vertically downward in the cross-linking oven. The pipe is deflected back into the horizontal plane by a roller provided at the outlet of the cross-linking oven.

The extruded melt pipe swells up after its exit from the pipe head of the extruder. In order to produce a pipe with a required nominal diameter, the pipe must therefore be drawn later in the extrusion line. However, this stretching process has disadvantageous consequences for shrinkage, which is a key quality criterion for the final product. This shrinkage must be as small as possible.

Therefore, the object of the present invention is to provide a method and an extrusion line with a cross-linking oven, which guarantee minimum shrinkage of the pipe produced.

SUMMARY OF THE INVENTION

The inventive solution is based on the finding that stretching of the pipe in the first heating section has a smaller influence on shrinkage of the final product than stretching in the second heating section. Therefore, according to the method of the present invention, the stretching processes in the first and second heating sections are monitored and regulated in such a manner that the necessary stretching of the pipe takes place primarily in the first heating section and the stretching of the pipe in the second heating section is controlled close to zero.

Pursuant to advantageous embodiments of the method, the stretching process in the first heating section is monitored by measuring the pipe diameters both prior to and after the first heating section, whereas the stretching process in the second heating section is monitored by measuring the pipe diameters both prior to and after the second heating section. In addition, the rotational speed of the deflection roller may be controlled in such a way that an optimum stretching process takes place in the first heating section. Sequence control of the haul-off or withdrawal speed can take place as a constant function of the rotational speed of the deflection roller. This sequence control of the haul-off may be accompanied by a second control system that reduces the speed of the haul-off to such an extent that the stretching process in the second heating section approaches close to zero.

The present invention also provides an extrusion line with a cross-linking oven, which has a first heating section that extends from its inlet to an electric driven deflection roller and a second heating section from the deflection roller to its outlet, wherein the height of the deflection roller and the angle of the heating sections to the horizontal plane are adjustable, and such adjustments are advantageously linked.

Such a cross-linking oven is used in pipes with larger diameters and wherein a reversal of 180 degrees on the deflection roller—as is normally the case in known cross-linking ovens—is difficult to implement. Through the height adjustment of the deflection roller and the possibility of adjusting the angle of the heating sections, even pipes with larger diameters facilitate optimum control during the stretching process in the first heating section, wherein the contact pressure between the deflection roller and the extruded pipe can be adjusted optimally.

The cross-linking oven can also be used for pipes with smaller diameters, wherein adjustment of the deflection roller and the heating sections facilitates adjustment of the stretching of the extruded pipe in addition to the actuation speed of the deflection roller and the haul-off speed.

BRIEF DESCRIPTION OF THE DRAWINGS

The invention is described with reference to the following embodiments. In the accompanying figures.

DESCRIPTION OF SPECIFIC EMBODIMENTS

Figure 1:
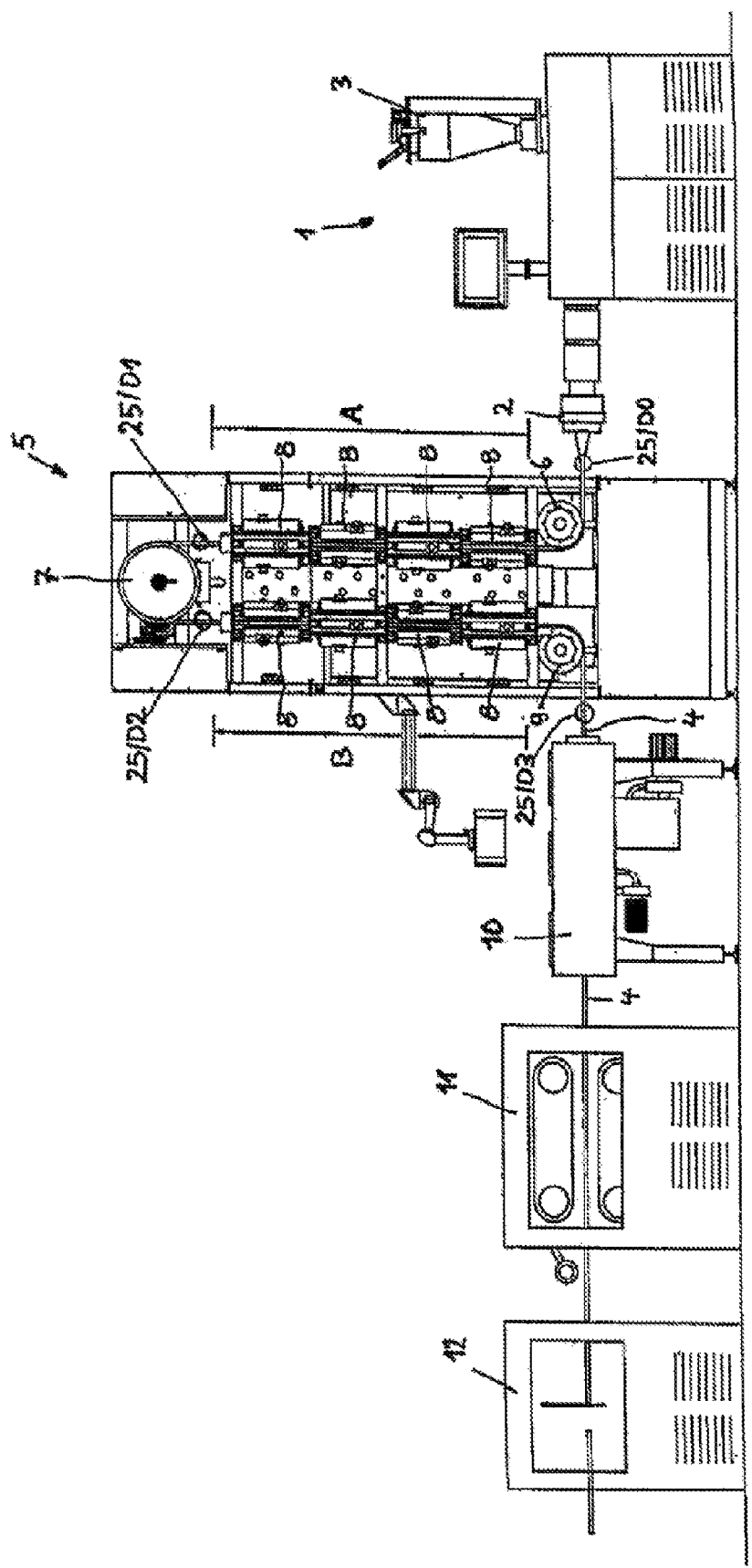
FIG. 1 shows a schematic representation of an extrusion line for producing peroxide-cross-linked polyethylene pipes in a first embodiment.

The extrusion line shown in FIG. 1 includes an extruder 1 with a pipe head 2 and a hopper 3. The extruder 1 is supplied with the polyethylene in granular or powder form, stabilizer and peroxide through the hopper 3 by means of a dosing system that is not illustrated. This mixture is heated, kneaded and plasticized in the extruder 1. Subsequently, the resulting moldable material is pressed through a continuous annular gap of the pipe head 2. After emerging from the pipe head 2, the hot and still ductile pipe 4 enters a cross-linking oven 5. The horizontally extruded pipe 4 is at first deflected by 90 degrees around a roller 6 at the inlet of the cross-linking oven 5, so as to facilitate its passage along the first heating section A vertically upward in the cross-linking oven 5. A larger electric driven deflection roller 7, on which the pipe 4 is reversed by 180 degrees, is arranged there and the pipe then runs along the second heating section B vertically downward in the cross-linking oven 5.

Each of the heating sections A and B has four consecutive infrared radiation modules 8, via which the pipe 4 receives the heat energy required for cross-linking.

At the outlet of the cross-linking oven 5, the pipe 4 is deflected by 90 degrees to the horizontal plane by another roller 9. After leaving the cross-linking oven 5, the pipe 4 enters a calibration and cooling unit 10, where it is cooled down. The calibration and cooling unit 10 in the extrusion line is followed by a haul-off or withdrawal mechanism 11, with which the extruded pipe 4 is pulled through the extrusion line. The end of the extrusion line is a saw unit 12, with which pipe sections are cut off the extruded pipe 4 to the desired length.

The extruded pipe 4 (melt pipe) swells up after emerging from the pipe head 2, so that stretching of the pipe 4 in the cross-linking oven 5 is required to achieve the desired nominal pipe diameter within the tolerance limits to be observed. For capturing measurement data of this stretching process, the cross-linking oven 5 has four measuring points 25 that are illustrated as circles, for example in the form of laser sensors. They facilitate measurement of the diameters before (D0) and after (D1) the first heating section A, and the diameters before (D2) and after (D3) the second heating section B. The stretching of the pipe 4 in the first heating section A is derived from the ratio $S1=D0/D1$ and the stretching in the second heating section B from the ratio $S2=D2/D3$.

The pipe 4, which is led through the cross-linking oven 5, is pulled via the top deflection roller 7 through the cross-linking oven 5. Here, the speed, i.e. the rpm, of the deflection roller 7 is regulated as a function of the mass flow rate at the pipe head 2, in such a manner that the stretching required for the nominal pipe diameter to be produced is realized primarily in the first heating section A.

A line speed that is different from that of the deflection roller 7 can be set by means of the haul-off 11 located in the extrusion line. If the line speed is greater than the speed of the deflection roller 7, the pipe 4 would be stretched in the second heating section B. This is to be avoided, as this stretching would have a negative influence on the specified shrinkage to be met. The speed of the haul-off 11 is therefore adjusted by a sequence control of the speed specified by the deflection roller 7, i.e. if the roller speed is changed, the haul-off speed also changes as a constant function of the roller speed. This sequence control is accompanied by a second control system, with which the speed of the haul-off 11 is reduced to such an extent that the stretching S2 approaches close to zero and thus, the expected shrinkage is minimized.

Figure 2:
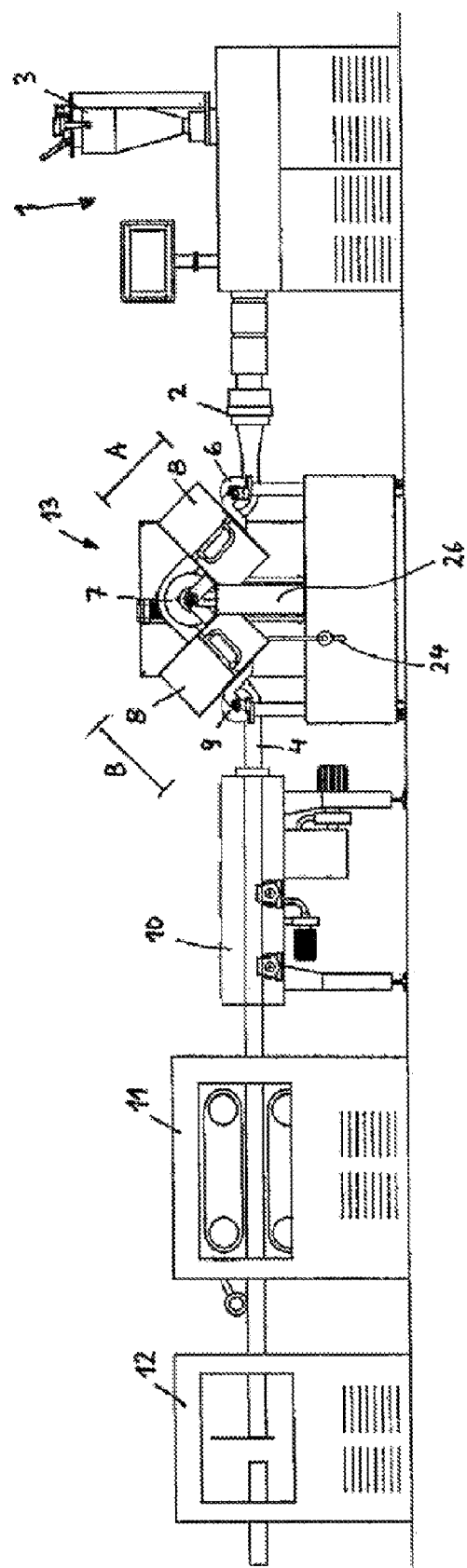
FIG. 2 shows a schematic representation of an extrusion line for producing peroxide-cross-linked polyethylene pipes in a second embodiment.
Figure 3:
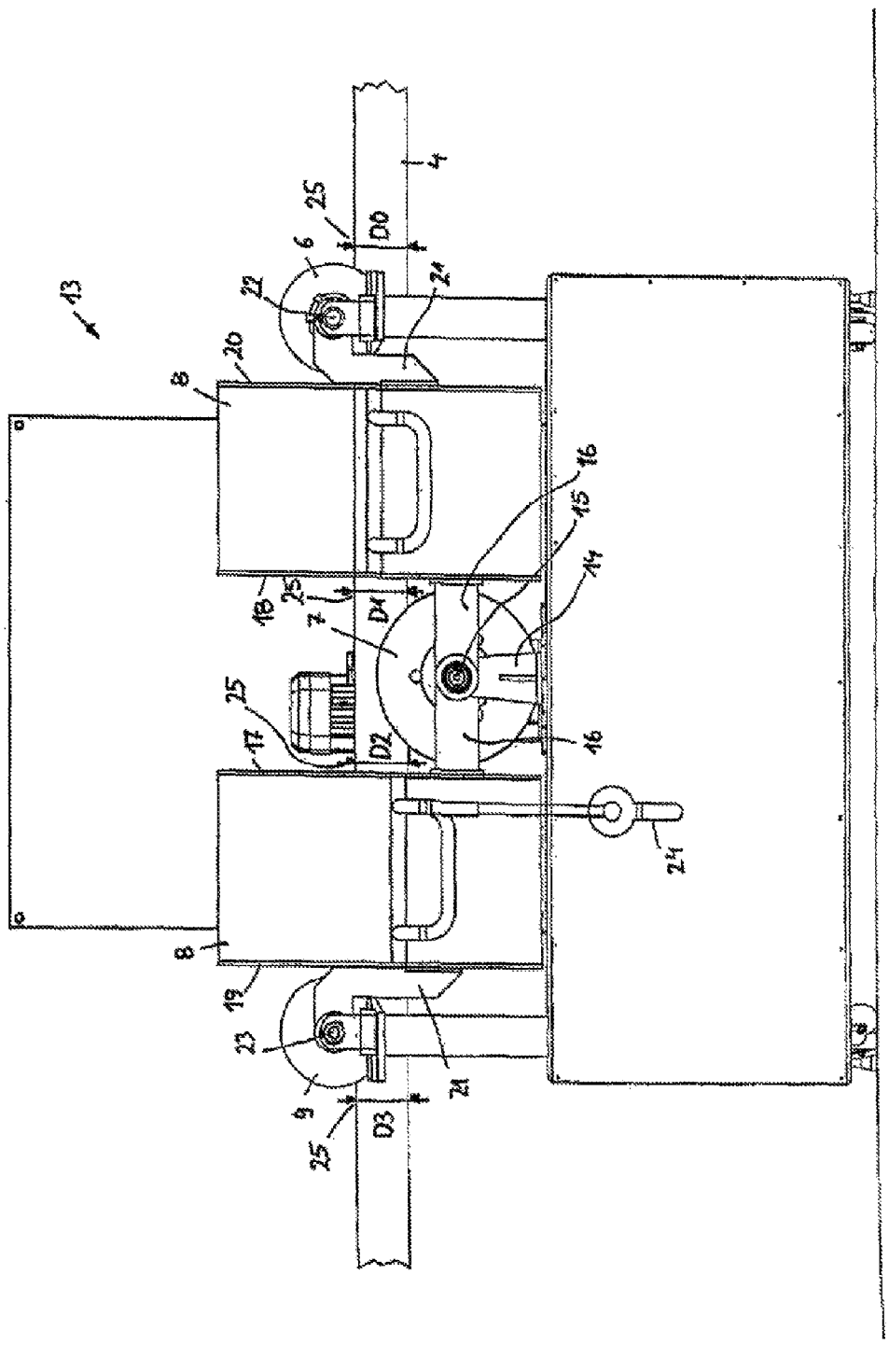
FIG. 3 shows an enlarged view of the cross-linking oven, which is in the starting position and is used in the extrusion line in accordance with FIG. 2.

FIGS. 2 and 3 describe another embodiment of the present invention which differs from the previous embodiment only in the fact that a different cross-linking oven 13 is used in the extrusion line. FIG. 3 shows an enlarged view of this cross-linking oven 13 in its starting position, while the cross-linking oven 13 in FIG. 2 is shown in its operating position.

Such a cross-linking oven 13 is used for production of pipes 4 of larger diameters, e.g. above 32 mm, because reversal of such pipes by 180 degrees—as is the case in the cross-linking oven 5 of the preceding embodiment—is difficult to realize in practice.

The cross-linking oven 13 is described in more detail below, wherein the reference signs of the previous embodiment are used for the same or operationally equivalent components.

The cross-linking oven 13 has a roller 6 at the inlet and a roller 9 at the outlet, as well as a larger electric driven deflection roller 7 arranged between rollers 6 and 9. An infrared radiation module 8 is arranged between the rollers 6 and 7, and 7 and 9 respectively, wherein the infrared radiation module 8 arranged between the rollers 6 and 7 forms the first heating section A, and the infrared radiation module 8 arranged between the rollers 7 and 9 forms the second heating section B.

In this embodiment, the diameters D0, D1, D2 and D3 are measured before and after the first heating section A and the second heating section B.

The deflection roller 7 forms an axis of rotation 15 with bearing blocks 14 arranged on both sides. The two bearing blocks 14 are arranged on a lifting cylinder 26 (FIG. 2).

Two support arms 16 which, at their ends facing away from the axis of rotation 15, are immovably connected with the housing panels 17, 18 of the infrared radiation modules 8, and are swivel-mounted on the axis of rotation 15 of the deflection roller 7. The housing panels 19, 20 of the infrared radiation modules 8 facing away from one another are also immovably connected with two additional support arms 21, whose other ends are swivel-mounted on the axes of rotation 22 and 23 of the rollers 6 and 9.

FIG. 3 shows the starting position of the cross-linking oven 13, wherein the pipe 4 leaving the extruder 1 is led horizontally through the cross-linking oven 13.

In order to control the stretching processes S1 and S2 in accordance with the previous embodiment, the cross-linking oven 13 must be adjusted from the starting position shown in FIG. 3 into an operating position shown in FIG. 2. For this purpose, the lifting cylinder 26 must be extended, which is achieved by actuating a hand lever 24. As a consequence, the deflection roller 7 moves to a raised position and takes the infrared radiation modules 8 along with it above the support arms 16, as a result of which the angles of the infrared radiation modules 8 are adjusted synchronously with the height adjustment of the deflection roller 7 through forced control by the pivoting support arms 16 and 21, so that they adjust to the tilt resulting from the height adjustment of the deflection roller.

Control of the extrusion line with regard to the stretching processes S1 and S2 of the extruded pipe 4 takes place as in the previous embodiment.

The specification incorporates by reference the disclosure of German priority document DE 10 2010 005 509.3 filed Jan. 23, 2010.

The present invention is, of course, in no way restricted to the specific disclosure of the specification and drawings, but also encompasses any modifications within the scope of the appended claims.

We claim:

1. An extrusion line for the production of peroxide cross-linked polyethylene pipes, comprising:
  a cross-linking oven (5, 13) having an actuated deflection roller (7), wherein said cross-linking oven furthermore has a first heating section (A) that extends from an inlet to said deflection roller (7) and a second heating section (B) that extends from said deflection roller to an outlet; and
  means for adjusting a height of said deflection roller (7) and an angle of said first and second heating sections (A, B) relative to a horizontal plane.

2. An extrusion line according to claim 1, which comprises further means for linking the adjustments of the height of said deflection roller (7) and the angle of said first and second heating sections (A, B).

* * * * *